(12) United States Patent
Martin et al.

(10) Patent No.: US 12,210,965 B2
(45) Date of Patent: Jan. 28, 2025

(54) INTERPRETABLE AUTONOMOUS DRIVING SYSTEM AND METHOD THEREOF

(71) Applicant: Honda Motor Co., Ltd., Tokyo (JP)

(72) Inventors: Sujitha Catherine Martin, San Jose, CA (US); Chen Tang, Albany, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1055 days.

(21) Appl. No.: 17/013,482

(22) Filed: Sep. 4, 2020

(65) Prior Publication Data

US 2021/0232913 A1 Jul. 29, 2021

Related U.S. Application Data

(60) Provisional application No. 62/966,381, filed on Jan. 27, 2020.

(51) Int. Cl.
*G06N 3/08* (2023.01)
*B60W 50/06* (2006.01)
(Continued)

(52) U.S. Cl.
CPC .............. *G06N 3/08* (2013.01); *B60W 50/06* (2013.01); *B60W 60/001* (2020.02); *G01C 21/3407* (2013.01); *G06N 5/04* (2013.01)

(58) Field of Classification Search
CPC ............ G06N 3/08; G06N 5/04; G06N 3/045; G06N 3/088; G06N 3/006; B60W 50/06; B60W 60/001; G01C 21/3407
See application file for complete search history.

(56) References Cited

U.S. PATENT DOCUMENTS 7,096,004 B2 8/2006 Minear et al.
8,837,718 B2 9/2014 Lauter et al.
(Continued)

FOREIGN PATENT DOCUMENTS

EP 3722908 A1 10/2020

OTHER PUBLICATIONS

Learning Robust Rewards with Adversarial Inverse Reinforcement Learning Conference Paper at ICLR , 2018. 15 pages. (Year: 2018).*

(Continued)

*Primary Examiner* — Hien L Duong
(74) *Attorney, Agent, or Firm* — Kubota & Basol LLP (57) ABSTRACT

In some examples, a dynamic system, including a vehicle, may be represented using a graph-based representation. One or more nodes in the graph-based representation may correspond to one or more agents in the dynamic system, and one or more edges between the nodes in the graph-based representation may correspond to one or more interactions between the agents in the dynamic system. The interactions may be defined based on human domain knowledge of the dynamic system. The dynamic system may be modeled using a respective machine learning model that includes a reward decoder that operates on the graph-based representation and evaluates one or more reward functions for the dynamic system. The one or more reward functions may be defined based on the human domain knowledge of the dynamic system. Autonomous operation of the vehicle may be controlled based on the modeling of the dynamic system.

21 Claims, 4 Drawing Sheets

(51) Int. Cl.
  B60W 60/00    (2020.01)
  G01C 21/34    (2006.01)
  G06N 5/04     (2023.01)

(56) References Cited

U.S. PATENT DOCUMENTS

| | | | |
|---|---|---|---|
| 10,021,103 | B2 | 7/2018 | Xu et al. |
| 11,243,532 | B1* | 2/2022 | Levihn ................... G06N 3/08 |
| 11,369,879 | B2* | 6/2022 | Juliani, Jr. ............. A63F 13/35 |
| 11,436,484 | B2 | 9/2022 | Farabet et al. |
| 11,537,134 | B1* | 12/2022 | Wiest ................. G06N 3/0455 |
| 2010/0033333 | A1 | 2/2010 | Victor et al. |
| 2014/0359305 | A1 | 12/2014 | Pappachan et al. |
| 2015/0195086 | A1 | 7/2015 | Davison |
| 2015/0222606 | A1 | 8/2015 | Yan |
| 2016/0359916 | A1 | 12/2016 | Kim et al. |
| 2017/0124407 | A1 | 5/2017 | Micks et al. |
| 2018/0009442 | A1 | 1/2018 | Spasojevic et al. |
| 2018/0024562 | A1 | 1/2018 | Bellaiche |
| 2018/0053103 | A1 | 2/2018 | Delgado et al. |
| 2019/0023208 | A1 | 1/2019 | Boston et al. |
| 2019/0101985 | A1* | 4/2019 | Sajda ...................... G06F 3/017 |
| 2019/0147610 | A1* | 5/2019 | Frossard ................ G06N 3/045 |
| | | | 382/103 |
| 2019/0225232 | A1 | 7/2019 | Blau |
| 2019/0236464 | A1* | 8/2019 | Feinson ................... G06N 5/04 |
| 2019/0266489 | A1* | 8/2019 | Hu ........................ B60W 10/20 |
| 2019/0283746 | A1 | 9/2019 | Shalev-Shwartz et al. |
| 2019/0384303 | A1 | 12/2019 | Muller et al. |
| 2020/0017117 | A1* | 1/2020 | Milton ................. G08G 1/0112 |
| 2020/0057487 | A1 | 2/2020 | Sicconi et al. |
| 2020/0082117 | A1 | 3/2020 | Simmons et al. |
| 2020/0086863 | A1* | 3/2020 | Rosman ................ G06V 20/58 |
| 2020/0139965 | A1 | 5/2020 | Hanna |
| 2020/0207358 | A1 | 7/2020 | Katz et al. |
| 2020/0210765 | A1 | 7/2020 | Chinni |
| 2020/0234145 | A1* | 7/2020 | Dai ..................... G06F 18/2413 |
| 2020/0344237 | A1 | 10/2020 | Murdoch et al. |
| 2020/0353943 | A1* | 11/2020 | Siddiqui ................ G06N 3/045 |
| 2020/0374269 | A1 | 11/2020 | Lidman |
| 2020/0384998 | A1 | 12/2020 | Yang et al. |
| 2021/0009163 | A1* | 1/2021 | Urtasun ................... G08G 1/20 |
| 2021/0116935 | A1* | 4/2021 | Kalabic ................ G05B 13/027 |
| 2021/0125067 | A1* | 4/2021 | Kamatani ............. G06N 3/088 |
| 2021/0150417 | A1* | 5/2021 | Fadel Argerich ...... G06N 3/084 |
| 2021/0163021 | A1* | 6/2021 | Frazzoli ............ B60W 60/0015 |
| 2021/0166148 | A1* | 6/2021 | Matsuura ............... G06N 10/00 |
| 2021/0213977 | A1* | 7/2021 | Aragon .................. G06N 3/084 |
| 2021/0248399 | A1 | 8/2021 | Martin et al. |
| 2021/0271866 | A1 | 9/2021 | Hayakawa et al. |
| 2021/0320947 | A1 | 10/2021 | Moridi |
| 2022/0122001 | A1 | 4/2022 | Choe et al. |
| 2022/0138568 | A1 | 5/2022 | Smolyanskiy et al. |
| 2022/0204020 | A1 | 6/2022 | Misu |
| 2022/0327840 | A1 | 10/2022 | Ambeck-madsen et al. |

OTHER PUBLICATIONS

Final Office Action received for U.S. Appl. No. 16/846,081, mailed on Aug. 17, 2022, 17 pages.
Final Office Action received for U.S. Appl. No. 16/950,820, mailed on May 17, 2022, 16 Pages.
Non-Final Office Action received for U.S. Appl. No. 16/846,081, mailed on Mar. 2, 2022, 15 pages.
Non-Final Office Action received for U.S. Appl. No. 16/950,820, mailed on Dec. 17, 2021, 11 pages.
Notice of Allowance received for U.S. Appl. No. 16/805,607, mailed on Jan. 27, 2022, 9 pages.
Alahi et al., "Social LSTM: Human Trajectory Prediction in Crowded Spaces", IEEE Conference on Computer Vision and Pattern Recognition (CVPR), Jun. 2016, pp. 961-971.
Anonymous, "Toward Simulation of Driver Behavior in Level 2 Driving Automation", Conference 17, USA, Jul. 2017, 5 pages.
Antoniou et al., "Data Augmentation Generative Adversarial Networks", Available Online at: <https://arxiv.org/abs/1711.04340>, 2017, 14 pages.
Arakawa Toshiya, "Trial Verification of Human Reliance on Autonomous Vehicles from the Viewpoint of Human Factors", International Journal of Innovative Computing, Information & Control, vol. 14, No. 2, 2017, pp. 491-501.
Barifah Maram, "Automatic Simulation of Users for Interactive Information Retrieval", In Proceedings of the 2017 Conference on Conference Human Information interaction and Retrieval, Association for Computing Machinery, Available Online at: <https://dl.acm.org/doi/pdf/10.1145/3020165.3022168>, 2017, pp. 399-401.
Becker et al., "Bosch's Vision and Roadmap Toward Fully Autonomous Driving", Available Online at: <https://doi.org/10.1007/978-3-319-05990-7_5>, 2014, 11 pages.
Bertoni et al., "MonoLoco: Monocular 3D Pedestrian Localization and Uncertainty Estimation", EPFL VITA lab, CH-1015 Lausanne, Aug. 2019, 11 pages.
Chen et al., "3D Object Proposals for Accurate Object Class Detection", Curran Associates Inc., Advances in Neural Information Processing Systems 28, 2015, pp. 424-432.
Chen et al., "Monocular 3D Object Detection for Autonomous Driving", IEEE Conference on Computer Vision and Pattern Recognition (CVPR), Jun. 2016, pp. 2147-2156.
Du et al., "Predicting Takeover Performance in Conditionally Automated Driving", Proc. Conference on Human Factors in Computing Systems (CHI), Available Online at: <https://dl.acm.org/doi/pdf/10.1145/3334480.3382963>, 2020, 8 pages.
Endsley Micar. , "Toward a Theory of Situation Awareness in Dynamic Systems", Hum Factors, vol. 37, No. 1, Available Online at: <https://doi.org/10.1518/001872095779049543>, Mar. 1995, pp. 32-64.
Faria et al., "The Effect of Augmented Reality Cues on Glance Behavior and Driver-initiated Takeover in Conditionally Automated Driving", In AutoUI in Submission, 2020, 15 pages.
Frid-Adar et al., "Gan-based Synthetic Medical Image Augmentation for Increased CNN Performance in Liver Lesion Classification", Available Online at: <https://doi.org/10.1016/j.neucom.2018.09.013>, 2018, 10 pages.
Geiger et al., "Vision Meets Robotics: The KITTI Dataset", International Journal of Robotics Research (IJRR), 2013, 6 pages.
Godard et al., "Unsupervised Monocular Depth Estimation with Left-Right Consistency", Available Online at: <http://visual.cs.ucl.ac.uk/pubs/monoDepth/>, Sep. 2016, 14 pages.
Gold et al., "Modeling take-over performance in level 3 conditionally automated vehicles", Accident Analysis and Prevention, Available Online at: <http://dx.doi.org/10.1016/j.aap.2017.11.009>, 2017, 11 pages.
Goodfellow et al., "Generative Adversarial Nets", Curran Associates, Inc., Available Online at: <http://papers.nips.cc/paper/5423-generative-adversarial-nets.pdf>, 2014, pp. 2672-2680.
Güler et al., "DensePose: Dense Human Pose Estimation in the Wild", In Proceedings of the IEEE Conference on Computer Vision and Pattern Recognition, 2018, pp. 7297-7306.
Gupta et al., "Social GAN: Socially Acceptable Trajectories with Generative Adversarial Networks", Mar. 2018, 10 pages.
Hayakawa et al., "Pedestrian Action Recognition and Localization Using RGB Images and Pose", 2020, 6 pages.
He et al., "Mask R-CNN", Facebook AI Research (FAIR), Jan. 2018, 12 pages.
Hergeth, "Keep Your Scanners Peeled: Gaze Behavior as a Measure of Automation Trust During Highly Automated Driving", Hum Factors 58, Available Online at: <https://doi.org/10.1177/0018720815625744>, May 2016, pp. 509-519.
Inagaki et al., "Human's Overtrust in and Overreliance on Advanced Driver Assistance Systems: A Theoretical Framework", International Journal of Vehicular Technology, Available Online at: <http://dx.doi.org/10.1155/2013/951762>, 2013, 8 pages.
Itani et al., "Privacy as a Service: Privacy-Aware Data Storage and Processing in Cloud Computing Architectures", Eighth IEEE International Conference on Dependable, Autonomic and Secure Computing, Dec. 2009, pp. 711-716.

(56) References Cited

OTHER PUBLICATIONS

Jajodia et al., "A Unified Framework for Enforcing Multiple Access Control Policies", ACM, 1997, 474-485 pages.
Kotseruba et al., "Joint Attention in Autonomous Driving (JAAD)", Apr. 2017, 10 pages.
Kreiss et al., "PifPaf: Composite Fields For Human Pose Estimation", In The IEEE Conference on Computer Vision and Pattern Recognition (CVPR), Jun. 2019, 10 pages.
Kumar et al., "Adaptive Trust Calibration for Level Driving Automation", Proc. IEEE Intelligent Transportation Systems Available Online at: <https://doi.org/10.1145/3334480.3382963>, Sep. 24, 2020, 10 pages.
Li et al., "Actional-Structural Graph Convolutional Networks for Skeleton-based Action Recognition", CVPR, Apr. 2019, 12 pages.
Li et al., "Investigating the Effects of Age and Disengagement in Driving on Driver's Takeover Control Performance in Highly Automated Vehicles", Transportation Planning and Technology, vol. 42, No. 5, Available online at: <https://doi.org/10.1080/03081060.2019.1609221>, 2019, pp. 470-497.
Liu et al., "Adversarial Learning of Task-Oriented Neural Dialog Models", Available Online at: <https://arxiv.org/abs/1805.11762>, 2018, 10 pages.
Liu et al., "CBNet: A Novel Composite Backbone Network Architecture for Object Detection", Wangxuan Institute of Computer Technology, Peking University, Department of Computer Science , Stony Brook University, Sep. 2019, 8 pages.
Liu et al., "High-Level Semantic Feature Detection: A New Perspective for Pedestrian Detection", In IEEE Conference on Computer Vision and Pattern Recognition (CVPR), 2019, pp. 5187-5196.
Liu et al., "SSD: Single Shot MultiBox Detector", Springer International Publishing AG, ECCV 2016, Part I, LNCS 9905, 2016, pp. 21-37.
Loper et al., "SMPL: A Skinned Multi-Person Linear Model", ACM Transactions on Graphics, vol. 34, No. 6, Oct. 2015, pp. 1-16.
Lu et al., "Eye Tracking: A Process-Oriented Method for Inferring Trust in Automation as a Function of Priming and System Reliability", IEEE, Transactions on Human-Machine Systems, Available online at: <https://doi.org/10.1109/THMS.2019.2930980>, Dec. 2019, pp. 560-568.
Magassouba et al., "Understanding Natural Language Instructions for Fetching Daily Objects Using GAN-Based Multimodal Target-Source Classification", Available Online at: <https://arxiv.org/abs/1906.06830>, 2017, 8 pages.
Maltz et al., "Imperfect In-vehicle Collision Avoidance Warning Systems Can Aid Distracted Drivers", Transportation Research Part F: Traffic Psychology and Behaviour Available Online at: <https://doi.org/10.1016/j.trf.2007.01.002>, 2007, pp. 345-357.
Mirza et al., "Conditional Generative Adversarial Nets", Available Online at: <https://arxiv.org/abs/1411.1784>, 2014, 7 pages.
Olsen Anneli, "The Tobii I-VT Fixation Filter", Tobii Technology, Mar. 20, 2012, 21 pages.
Pal et al., ""Looking at The Right Stuff"—Guided Semantic-Gaze for Autonomous Driving", The IEEE/CVF Conference on Computer Vision and Pattern Recognition (CVPR), 2020, 10 pages.
Ramanishka et al., "Toward Driving Scene Understanding: A Dataset for Learning Driver Behavior and Causal Reasoning", In Conference on Computer Vision and Pattern Recognition, 2018, 9 pages.
Rasouli et al., "Pedestrian Action Anticipation Using Contextual Feature Fusion in Stacked RNNs", BMVC, 2019, 13 pages.
Redmon et al., "YOLOv3: An Incremental Improvement", University of Washington, Apr. 2018, 6 pages.
SAE International, "Taxonomy and Definitions for Terms Related to On-Road Motor Vehicle Automated Driving Systems", Available Online at: <https://www.sae.org/news/3544/>, 2014, 35 pages.
Schatzmann et al., "A Survey of Statistical User Simulation Techniques for Reinforcement-Learning of Dialogue Management Strategies", The Knowledge Engineering Review, Available Online at: <https://doi.org/10.1017/S0269888906000944>, Jun. 2006, 33 pages.

Si et al., "An Attention Enhanced Graph Convolutional LSTM Network for Skeleton-Based Action Recognition", Mar. 2019, 10 pages.
Tawari et al., "Learning to Attend to Salient Targets in Driving Videos Using Fully Convolutional RNN", 21st International Conference on Intelligent Transportation Systems (ITSC), 2018, 8 pages.
Tobiipro, "Tobii Pro Lab User Manual", Available Online at: <https://www.tobiipro.com/siteassets/tobii-pro/user-manuals/Tobii-Pro-Lab-User-Manual/>, Aug. 31, 2015, 148 pages.
Toshev et al., "DeepPose: Human Pose Estimation via Deep Neural Networks.", IEEE Conference on Computer Vision and Pattern Recognition, 2014, pp. 1653-1660.
Van Dijk et al., "On the Impossibility of Cryptography Alone for {Privacy-Preserving} Cloud Computing", 5th USENIX Workshop on Hot Topics in Security (HotSec 10), 2010, 8 pages.
Wang et al., "Temporal Segment Networks: Towards Good Practices for Deep Action Recognition", Aug. 2016, 16 pages.
Wei et al., "Convolutional Pose Machines", CVPR, 2016, 9 pages.
Wojke et al., "Simple Online and Realtime Tracking With a Deep Association Metric", IEEE International Conference on Image Processing (ICIP), 2017, pp. 3645-3649.
Wu et al., "Drivers' Attitudes and Perceptions towards a Driving Automation System with Augmented Reality Human-Machine Interface", Proc. IEEE Intelligent Vehicles Symposium, Available Online at: <https://doi.org/10.1109/IV47402.2020.9304717>, 2020, 6 pages.
Wu et al., "Take-Over Performance and Safety Analysis Under Different Scenarios and Secondary Tasks in Conditionally Automated Driving", IEEE, 2019, pp. 136924-136933.
Xia Qi, "MeDShare: Trust-Less Medical Data Sharing Among Cloud Service Providers via Blockchain", IEEE, vol. 5, Jul. 24, 2017, 14757-14767 pages.
Yan et al., "Spatial Temporal Graph Convolutional Networks for Skeleton-Based Action Recognition", Department of Information Engineering, The Chinese University of Hong Kong, Jan. 2018, 10 pages.
Yang et al., "3D Human Pose Estimation in the Wild by Adversarial Learning", IEEE/CVF Conference on Computer Vision and Pattern Recognition, 2018, pp. 5255-5264.
Zhang, "CityPersons: A Diverse Dataset for Pedestrian Detection", Feb. 2017, 12 pages.
Zheng et al., "Mars: A Video Benchmark For Large-Scale Person Re-Identification", In Computer Vision—ECCV 2016, Sep. 2016, pp. 868-884.
Zhou et al., "Temporal Relational Reasoning in Videos", Jul. 2018, 16 pages.
Zhu et al., "StarNet: Pedestrian Trajectory Prediction using Deep Neural Network in Star Topology", Jun. 2019, 6 pages.
Zhu et al., "Unpaired Image-to-Image Translation using Cycle-Consistent Adversarial Networks", In IEEE International Conference on Computer Vision (ICCV), 2017, 18 pages.
Alemi et al., "Deep Variational Information Bottleneck", Conference Paper at ICLR 2017, 2017, 19 pages.
Bojarski et al., "End to End Learning for Self-Driving Cars", NVIDIA Corporation, Holmdel, NJ 07735, Apr. 25, 2016, 9 pages.
Bojarski et al., "VisualBackProp: Visualizing CNNs for Autonomous Driving", Nov. 16, 2016, 13 pages.
Chen et al., "Multi-View 3D Object Detection Network for Autonomous Driving", Department of Electronic Engineering, Tsinghua University, Baidu Inc., Jun. 22, 2017, 9 pages.
Finn et al., "A Connection Between Generative Adversarial Networks, Inverse Reinforcement Learning, and Energy-Based Models", University of California, Berkeley, Nov. 25, 2016, 10 pages.
Finn et al., "Guided Cost Learning: Deep Inverse Optimal Control via Policy Optimization", University of California, Berkeley, Berkeley, CA 94709 USA, May 27, 2016, 13 pages.
Fu et al., "Learning Robust Rewards with Adversarial Inverse Reinforcement Learning", Conference Paper at ICLR 2018, Department of Electrical Engineering and Computer Science, University of California, 2018, 15 pages.
Gilmer et al., "Neural Message Passing for Quantum Chemistry", Jun. 12, 2017, 14 pages.

(56) References Cited

OTHER PUBLICATIONS

Hoshen, Yedid, "VAIN: Attentional Multi-agent Predictive Modeling", Facebook AI Research, NYC, Sep. 28, 2018, 12 pages.
Jang et al., "Categorical Reparameterization With Gumbel—Softmax", conference paper at ICLR 2017, Aug. 5, 2017, 13 pages.
Kesting et al., "Enhanced Intelligent Driver Model to Access the Impact of Driving Strategies on Traffic Capacity", Institute for Transport & Economics, Dec. 18, 2009, 20 pages.
Kim et al., "Interpretable Learning for Self-Driving Cars by Visualizing Causal Attention", Computer Science Division, University of California, Berkeley, CA 94720, USA, Mar. 30, 2017, 9 pages.
Kim et al., "Textual Explanations for Self-Driving Vehicles", EECS, University of California, Berkeley CA 94720, USA, MPI for Informatics, Saarland Informatics Campus, 66123 Saarbrucken, Germany, AMLab, University of Amsterdam, 1098 XH Amsterdam, Netherlands, Jul. 30, 2018, 24 pages.
Kipf et al., "Neural Relational Inference for Interacting Systems", Jun. 6, 2018, 17 pages.
Levine, Sergey, "Reinforcement Learning and Control as Probabilistic Inference: Tutorial and Review", UC Berkeley, May 20, 2018, 22 pages.
Peng et al., "Variational Discriminator Bottleneck: Improving Imitation Learning, Inverse RL and GANs By Constraining Information Flow", University of California, Berkeley, Dec. 29, 2018, 27 pages.
Steenkiste et al., "Relational Neural Expectation Maximization: Unsupervised Discovery of Objects and Their Interactions", Conference Paper at ICLR 2018, Feb. 28, 2018, 15 pages.
Sukhbaatar et al., "Learning Multiagent Communication with Backpropagation", 29th Conference on Neural Information Processing Systems (NIPS 2016), Barcelona, Spain., Oct. 31, 2006, 12 pages.
Sun et al., "Probabilistic Prediction of Interactive Driving Behavior via Hierarchical Inverse Reinforcement Learning", Sep. 9, 2018, 7 pages.
Tang et al., "Disturbance-Observer-Based Tracking Controller for Neural Network Driving Policy Transfer", IEEE Transactions On Intelligent Transportation Systems, Dec. 5, 2019, 12 pages.
Velickovic et al., "Graph Attention Networks", Conference Paper at ICLR 2018, Feb. 4, 2018, 12 pages.
Yu et al., "Multi-Agent Adversarial Inverse Reinforcement Learning", Jul. 30, 2019, 13 pages.
Ziebart et al., "Maximum Entropy Inverse Reinforcement Learning", School of Computer Science, Carnegie Mellon University, Pittsburgh, PA 15213, Proceedings of the Twenty-Third AAAI Conference on Artificial Intelligence, 2008, 6 pages.
Final Office Action received for U.S. Appl. No. 17/139,788, mailed on Mar. 10, 2023, 19 pages.
Non-Final Office Action received for U.S. Appl. No. 17/139,788, mailed on Jul. 27, 2023, 17 pages.
Non-Final Office Action received for U.S. Appl. No. 17/139,788, mailed on Nov. 2, 2022, 15 pages.
Notice of Allowance received for U.S. Appl. No. 16/950,820, mailed on Oct. 21, 2022, 5 pages.
Notice of Allowance received for U.S. Appl. No. 16/846,081, mailed on Dec. 7, 2022, 8 pages.
Bolstad et al., "Measurement of Situation Awareness for Automobile Technologies of the Future", Performance Metrics for Assessing Driver Distraction: the Quest for Improved Road Safety, 2010, 18 pages.
Endsley, Mica R., "A Systematic Review and Meta-Analysis of Direct Objective Measures of Situation Awareness: A Comparison of SAGAT and SPAM", Human factors, doi: 10.1177/0018720819875376, Available online at: <http://www.ncbi.nlm.nih.gov/pubmed/31560575>, Sep. 2019, pp. 124-150.
Gabbard et al., "AR DriveSim: An Immersive Driving Simulator for Augmented Reality Head-Up Display Research", Frontiers for Augmented Reality Head-Up Display Research, Frontiers in Robotics and AI, vol. 6, Available online at: <https://www.frontiersin.org/article/10.3389/frobt.2019.00098/full>, Oct. 23, 2019, 16 pages.

Gregoriades et al., "Simulation-based Evaluation of an in-vehicle Smart Situation Awareness Enhancement System", Ergonomics, vol. 61, No. 7, Available online at: <https://www.tandfonline.com/doi/full/10.1080/00140139.2018.1427803>, 2018, 24 pages.
Just et al., "A Theory of Reading: From Eye Fixations to Comprehension", Psychological Review, vol. 87, No. 04, Jul. 1980, pp. 329-354.
Kim et al., "Assessing Distraction Potential of Augmented Reality Head-Up Displays for Vehicle Drivers", Human Factors: The Journal of the Human Factors and Ergonomics Society, Available online at: <http://journals.sagepub.com/doi/10.1177/0018720819844845>, May 2019, 14 pages.
Kim, Hyungil, "Augmented Reality Pedestrian Collision Warning: An Ecological Approach to Driver Interface Design and Evaluation", PhD Dissertation, Virginia Tech., Sep. 29, 2017, 144 pages.
Kim et al., "Toward Prediction of Driver Awareness of Automotive Hazards: Driving-Video-Based Simulation Approach", Proceedings of the Human Factors and Ergonomics Society Annual Meeting, vol. 63, No. 1, Available online at: <http://journals.sagepub.com/doi/10.1177/1071181319631003>, Nov. 2019, pp. 2099-2103.
Kim et al., "Toward Real-Time Estimation of Driver Situation Awareness: An Eye Tracking Approach based on Moving Objects of Interest", 2020 IEEE Intelligent Vehicles Symposium (IV), doi: 10.1109/IV47402.2020.9304770, 2020, 7 pages.
Kim et al., "Virtual Shadow: Making Cross Traffic Dynamics Visible Through Augmented Reality Head Up Display", Proceedings of the Human Factors and Ergonomics Society, SAGE Publications, 2016, pp. 2093-2097.
Koenderink et al., "Spatial and Temporal Parameters of Motion Detection in the Peripheral Visual Field", Journal of the Optical Society of America A, vol. 2, No. 2, Available online at: <https://www.osapublishing.org/abstract.cfm?URI=josaa-2-2-252>, Feb. 1985, pp. 252-259.
Kuefler et al., "Imitating Driver Behavior with Generative Adversarial Networks", IEEE, Jan. 24, 2017, 8 pages.
Li et al., "Improved Generative Adversarial Networks with Reconstruction Loss", Neurocomputing, vol. 323, 2019, pp. 363-372.
Martin et al., "Dynamics of Driver's Gaze: Explorations in Behavior Modeling & Maneuver Prediction", IEEE Transactions on Intelligent Vehicles, vol. 3, No. 2, Feb. 2018, 10 pages.
Martinez et al., "Driving Style Recognition for Intelligent Vehicle Control and Advanced Driver Assistance", IEEE Transactions on Intelligent Transportation Systems, vol. 19, No. 3, Mar. 3, 2018, pp. 666-676.
Moore et al., "Development of a Novel Measure of Situation Awareness: The Case for Eye Movement Analysis", Proceedings of the Human Factors and Ergonomics Society Annual Meeting, vol. 54, No. 19, Available online at: <http://journals.sagepub.com/doi/10.1177/154193121005401961>, Sep. 2010, pp. 1650-1654.
Oliver et al., "Graphical Models for Driver Behavior Recognition in a Smartcar", IEEE, 2000, 6 pages.
Platho et al., "Learning Driving Situations and Behavior Models from Data", Proceedings of the 16th International IEEE Annual Conference on Intelligent Transportation Systems (ITSC 2013), The Hague, The Netherlands, Oct. 6-9, 2013, pp. 276-281.
Rayner et al., "Eye Movements", Scholarpedia, vol. 2, No. 10, Available online at: <http://www.scholarpedia.org/article/Eye movements> [Retrieved Mar. 17, 2022], 2007, 11 pages.
Rucci et al., "Fixational Eye Movements and Perception", Vision Research, Jan. 2016, pp. 1-4.
Rushton et al., "Behavioral Development and Construct Validity: The Principle of Aggregation", Psychological Bulletin, vol. 94, No. 1, Jul. 1983, pp. 18-38.
Salvucci, Dario, "Modeling Driver Behavior in a Congitive Architecture", Human Factors, vol. 48, 2006, pp. 362-380.
Sethumadhavan, Arathi, "Knowing What You Know: The Role of Meta-Situation Awareness in Predicting Situation Awareness", Proceedings of the Human Factors and Ergonomics Society Annual Meeting, vol. 55, No. 1, Available online at: <http://pro.sagepub.com/lookup/doi/10.1177/1071181311551074>, Sep. 2011, pp. 360-364.
Strasburger et al., "Peripheral Vision and Pattern Recognition: A Review", Journal of Vision, vol. 11, No. 5, 2011, pp. 1-82.

(56) References Cited

OTHER PUBLICATIONS

Tobii Technology, "Tobii Glasses Eye Tracker User Manual", Danderyd, Sweden: Tobii Technology AB, 2012, 70 pages.

Uricar et al., "Yes, We Gan: Applying Adversarial Techniques for Autonomous Driving", arXiv:1902.03442v2, Feb. 2, 2020, 16 pages.

Vondrick et al., "Efficiently Scaling Up Crowdsourced Video Annotation", International Journal of Computer Vision, vol. 101, No. 1, Jan. 2013, 22 pages.

Wickens et al., "Modeling of Situation Awareness Supported by Advanced Flight Deck Displays", Proceedings of the Human Factors and Ergonomics Society Annual Meeting, vol. 51, No. 12, Available online at: <http://journals.sagepub.com/doi/10.1177/154193120705101204>, Oct. 2007, pp. 794-798.

Winter et al., "Situation Awareness Based on Eye Movements in Relation to the Task Environment", Cognition, Technology and Work, 2019, 14 pages.

Zhang et al., "Deeproad: Gan-Based Metamorphic Testing and Input Validation Framework for Autonomous Driving System", 2018 33rd IEEE/ACM International Conference on Automated Software Engineering (ASE), Sep. 3, 2018, 11 pages.

Notice of Allowance received for U.S. Appl. No. 17/139,788, mailed on Feb. 14, 2024, 9 pages.

\* cited by examiner

INTERPRETABLE AUTONOMOUS DRIVING SYSTEM AND METHOD THEREOF

CROSS-REFERENCE TO RELATED APPLICATIONS

This application claims priority to U.S. Provisional Application Ser. No. 62/966,381 filed Jan. 27, 2020 titled Towards Explainable Autonomous Driving with Interpretable Relational Inference, which is hereby incorporated by reference in its entirety for all purposes.

FIELD OF THE DISCLOSURE

This disclosure relates generally to autonomous driving systems with improved human-interpretability, and more particularly, to using a machine learning model that is based on human domain knowledge to provide such improved interpretability.

BACKGROUND OF THE DISCLOSURE

Artificial intelligence and deep learning have been utilized to address a variety of problems in autonomous driving, ranging from perception to control. In spite of the substantial progress brought by learning-based methods, people are realizing that explainability (e.g., human-interpretability) may be helpful for autonomous systems like autonomous vehicles, which may interact with other road participants during operation. For example, humans may need to understand and anticipate the actions taken by the autonomous systems for effective cooperation.

SUMMARY

This summary is provided to introduce a selection of concepts in a simplified form that are further described below in the Detailed Disclosure. This summary is not intended to identify key features of the claimed subject matter, nor is it intended to be used as an aid in determining the scope of the claimed subject matter.

Some examples of the disclosure are directed to a method including representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system. In some examples, the method may include modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system. In some examples, the method may include controlling autonomous operation based on the modeling of the dynamic system.

Some examples of the disclosure are directed to an electronic device including one or more processors, and memory storing instructions, which when executed by the one or more processors, cause the electronic device to perform a method. In some examples, the method includes representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system. In some examples, the method includes modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system. In some examples, the method includes controlling autonomous operation based on the modeling of the dynamic system.

Some examples of the disclosure are directed to a non-transitory computer-readable storage medium storing instructions, which when executed by one or more processors of an electronic device, cause the electronic device to perform a method. In some examples, the method includes representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system. In some examples, the method includes modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system. In some examples, the method includes controlling autonomous operation based on the modeling of the dynamic system.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing are not necessarily drawn to scale and certain may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings.

DETAILED DESCRIPTION

In the following description, reference is made to the accompanying drawings which form a part hereof, and in which it is shown by way of illustration specific examples that may be practiced. It is to be understood that other examples may be used and structural changes may be made without departing from the scope of the examples of the disclosure.

In some machine and/or learning-based systems (e.g., systems that implement vision-based end-to-end driving policies), the causal relationship between visual input (e.g., captured by one or more cameras on a vehicle) and action (e.g., the resulting autonomous or semi-autonomous action taken by the vehicle) may be represented via a visual attention mechanism and/or deconvolution based approach. However, a pixel-wise causal relation between (e.g., high-dimensional) image input and action may not be consistent with human intuition of such inputs and outputs. Rather, humans may interact with other road participants and infrastructure rather than specific pixels while driving, for example.

Generally described, the present system and method thereof provides an end-to-end driving model with inherent interpretability. A representation of the environment of a vehicle, in addition or alternatively to images, may be used as input to the model, where the input may be directly interpreted (e.g., by humans) and/or for which causality between it and the output (e.g., driving action taken by) of the driving model may be understood by humans. This representation may be a graph representation of the relevant system of interest (e.g., the system being the vehicle, object(s) in its surroundings, pedestrian(s) in its surroundings, or more generally any agent or entity that may be involved with and/or relevant to the actions to be taken by the driving model), with nodes that correspond to agents (e.g., vehicles, pedestrians, other entities in the environment of the vehicle) involved in the system, and edges between the nodes that correspond to interactions between the agents. The model may be a grounded interpretable relational inference (GIRI) model that combines neural relational inference (NRI) and/or inverse reinforcement learning (IRL). The model may be able to model the underlying dynamics of an interactive system, such as a system including a vehicle and its surroundings, by inferring an interpretable interaction graph whose edges may represent the internal relations among the agents in the system. The relations indicated by the edges may be defined explicitly based on the domain knowledge of humans, thereby providing greater human understandability of the model, its inputs, its outputs and/or its operations. Such a GIRI model will be described below.

Figure 1:
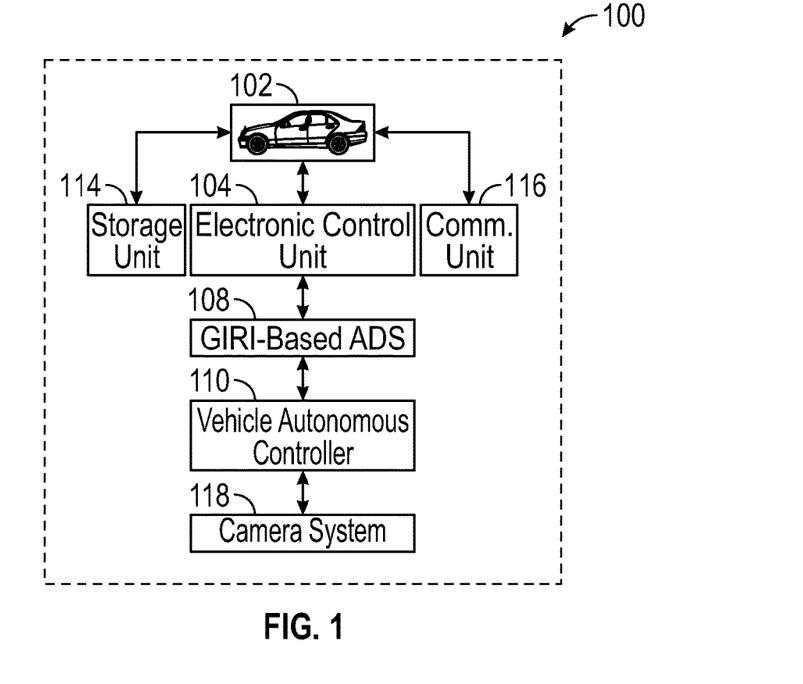
FIG. 1 is a schematic view of an exemplary system for implementing a grounded interpretable relational inference (GIRI)-based autonomous driving model according to some examples of the disclosure.

FIG. 1 is a schematic view of an exemplary system 100 for implementing a GIRL-based autonomous driving model according to some examples of the disclosure. The components of the system 100, as well as the components of other systems, hardware architectures, and software architectures discussed herein, may be combined, omitted, or organized into different architectures for various examples.

Generally, the system 100 may include a vehicle 102 with an electronic control unit (ECU) 104 that executes one or more applications, operating systems, vehicle systems and subsystem user interfaces, among others. The ECU 104 may also execute a GIRI-based autonomous driving system (ADS) 108 that may be configured to operate on inputs representing the dynamic system including vehicle 102, and generate autonomous driving outputs to control operation of vehicle 102 during semi-autonomous/autonomous operation of the vehicle 102, as will be described in more detail below.

The GIRL-based ADS 108 may be configured to utilize one or more graphical neural networks to execute machine learning/deep learning models, such as a GIRL model, that will be described later. In some examples, the GIRI-based ADS 108 may be configured to recognize characteristics of an environment of vehicle, such as actions of other vehicles and/or pedestrians in the environment of the vehicle, and in some examples, generate vehicle control outputs based on those characteristics, during semi-autonomous/autonomous operation of the vehicle 102 by a vehicle autonomous controller 110 of the vehicle 102. In some examples, the vehicle autonomous controller 110 may be configured to alter the semi-autonomous/autonomous operation of one or more driving functions of the vehicle 102 (e.g., braking, turning, acceleration, etc.) based on the results of the GIRL-based ADS 108.

The ECU 104 of the vehicle 102 may execute one or more applications-including the GIRL-based ADS 108-operating systems, vehicle systems and subsystem executable instructions, among others. In some examples, the ECU 104 may include a respective microprocessor, one or more application-specific integrated circuit(s) (ASIC), or other similar devices. The ECU 104 may also include respective internal processing memory, an interface circuit, and bus lines for transferring data, sending commands, and communicating with the plurality of components of the vehicle 102. The ECU 104 may also include a respective communication device (not shown) for sending data internally to components of the vehicle 102 and communicating with externally hosted computing systems (e.g., external to the vehicle 102).

In an exemplary embodiment, the ECU 104 may additionally communicate with a storage unit 114 (e.g., memory, such as a computer-readable storage medium that stores instructions for the various functions or applications implemented by the system 100) to execute one or more applications, operating systems, vehicle systems and subsystem user interfaces, and the like that are stored on the storage unit 114. In one or more embodiments, the storage unit 114 may be accessed by the GIRI-based ADS 108 to store data, for example, one or more images, graph-based representations, or otherwise, of a surrounding environment of the vehicle 102, one or more sets of locational coordinates (e.g., GPS/DGPS coordinates), and/or vehicle dynamic data associated with dynamic vehicle parameters of the vehicle 102.

In some examples, the ECU 104 may be configured to communicate with the vehicle autonomous controller 110 of the vehicle 102 to execute autonomous driving commands to operate the vehicle 102 to autonomously control one or more driving functions of the vehicle 102. The one or more driving functions may include, but are not limited to, steering, braking, accelerating, merging, turning, coasting, and the like. In some examples, the GIRL-based ADS 108 may communicate with the vehicle autonomous controller 110 to control an autonomous operation of one or more driving functions of the vehicle 102. In some examples, the GIRI-based ADS 108 may be configured to communicate with the vehicle autonomous controller 110 to provide autonomous operation of one or more driving functions of the vehicle 102 to account for one or more external factors that may include, but are not limited to, road/pathway conditions of a road/pathway on which the vehicle 102 is traveling, a lane in which the vehicle 102 is traveling, status of traffic signals, traffic patterns, traffic regulations, pedestrian actions in an environment of the vehicle, other vehicle actions in an environment of the vehicle, pedestrian locations in an environment of the vehicle, other vehicle locations in an environment of the vehicle, etc.

In some examples, the ECU 104 may additionally be configured to operably control a camera system 118 of the vehicle 102. The camera system 118 may include one or more cameras (not shown) that are positioned at one or more positions on or in the vehicle 102 to capture images of at least the external surrounding environment of the vehicle 102 (e.g., a predetermined area located around (such as front/side/behind) the vehicle 102).

In particular, the one or more cameras that are positioned in or on the vehicle may be configured to capture images of vehicles, pedestrians, or more generally any agents or structures in an environment of the vehicle 102 to be analyzed by the GIRL-based ADS 108. In some examples, the one or more cameras may be configured to capture images of the above and transmit respective image data to the GIRL-based ADS 108. The GIRL-based ADS 108 may be configured to process the image data to recognize locations, actions, existences, etc. of one or more agents/structures in an environment of the vehicle 102. The GIRL-based ADS 108 may be configured to convert those images to graph-based representations of the system including vehicle 102, as will be described later.

In some examples, the one or more cameras that are positioned to capture the external surrounding environment of the vehicle 102 may be disposed at one or more external front portions of the vehicle 102. The one or more cameras of the camera system 118 may be disposed at external front portions of the vehicle 102, including, but not limited to different portions of the vehicle bumper, vehicle front lighting units, vehicle fenders, and the windshield. In some examples, the one or more cameras may be configured as RGB cameras that may capture RGB bands that are configured to capture rich information about object appearance, as well as relationships and interactions between the vehicle 102 and objects (e.g., pedestrians) within the surrounding environment of the vehicle 102.

In some examples, the one or more cameras may be monocular cameras, outputs from each of which may be analyzed by GIRL-based ADS 108. The camera system 118 may be configured to convert one or more RGB images/videos (e.g., sequences of images) into image data that is communicated to the GIRL-based ADS 108 to be analyzed. While the GIRL-based ADS 108 is shown as being executed by ECU 104, it is understood that in some examples, the GIRI-based ADS 108 may be executed by a processor other than ECU 104. Further, in some examples, GIRI-based ADS 108 may be executed on a remote server (e.g., with one or more processors and memory), which may communicate with ECU 104 via communications unit 116, via which ECU 104 may transmit and/or receive appropriate information for proper operation of GIRI-based ADS 108.

Figure 2:
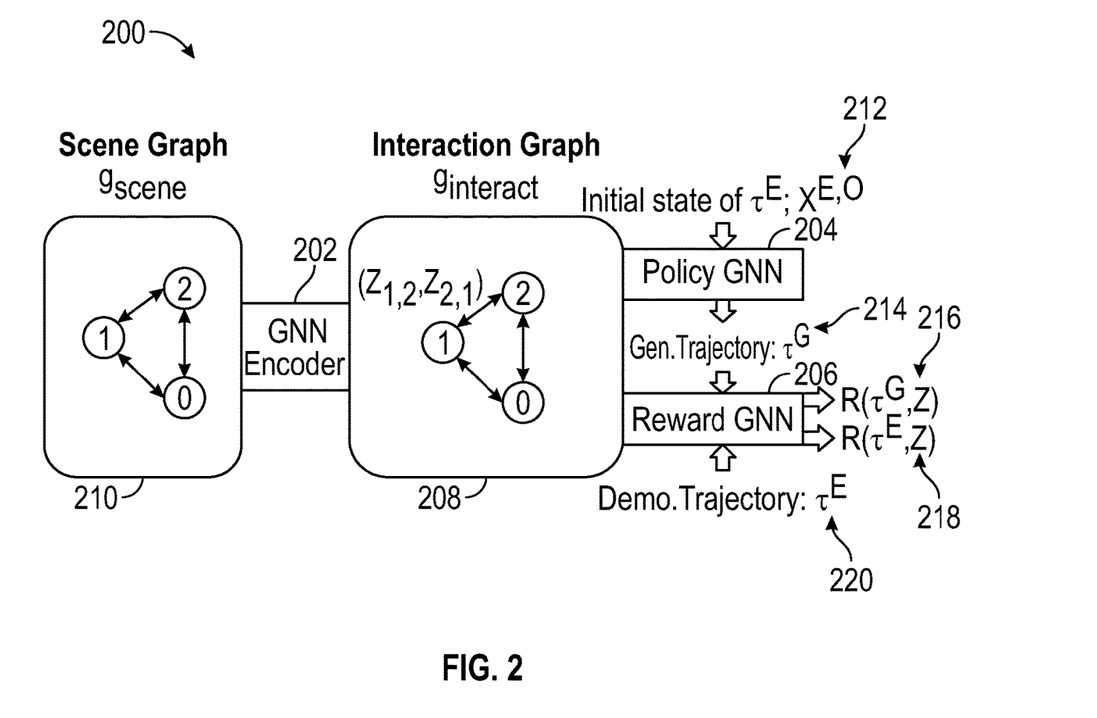
FIG. 2 illustrates an example overview of a GIRI model according to some examples of the disclosure.

FIG. 2 illustrates an example overview of a GIRL model 200 according to some examples of the disclosure. The GIRI model 200 may be implemented by the GIRI-based ADS 108 in FIG. 1. In particular, in some examples, a graph representation and/or graph neural network (GNN) may be used to model an interactive system involving the vehicle (e.g., vehicle 102). The interactive system, including the vehicle, may be represented by a partially or fully-connected graph in which the agents that are operating in the system are represented by nodes in the graph. For example, in a scenario in which the system includes three vehicles, each vehicle in the system may be represented by a node in the graph, and the connections between the nodes may represent the interaction(s) between those vehicles in the system. The GNN may operate directly on the graph as an input, and may be trained to model the system. In some examples, the interactions between nodes (e.g., representing agents) in the graph may be modeled via the GNN, and in some examples, may be modeled via the GNN in an unsupervised fashion. In some examples, this may be accomplished via a neural relational inference (NM) model in the form of a variational autoencoder (VAE).

A latent interaction graph may be inferred (e.g., determined and/or generated) by a GNN encoder, and within the latent interaction graph, discrete edge variables may represent pairwise interaction types (e.g., interaction types between two nodes forming the edge, the two nodes corresponding to two agents in the system). A GNN decoder may operate on the inferred latent interaction graph (e.g., as an input to the GNN decoder) to model the dynamics of the system. As described above, one or more graph structures may be used in the above model in which nodes may represent agents in the system, and connections between nodes (e.g., edges) may represent interactions between agents in the system-therefore, representing the dynamics of a given agent via its relationship with other agents in the system. As such, the relationship between inputs and outputs of the model may be more understandable to humans as compared with image-based (e.g., pixel-based) models.

However, if the inferred latent interaction graph, and therefore the interactions/relationships between nodes in the inferred latent interaction graph, are determined solely through unsupervised machine learning, the meaning of determined interactions/relationships between nodes may only be able to be determined after the fact. Further, for systems with complex interactions between agents in particular (e.g., with multiple pedestrians performing different types of actions, such as running, crossing streets, playing catch, etc.), it may be difficult for humans to understand the meanings of the determined interactions/relationships.

Therefore, some examples of the disclosure are directed to a grounded interpretable relational inference (GIRI) model 200 for modeling the dynamics of a system (e.g., a system that includes the vehicle, pedestrians, other vehicles, etc.) that may include one or more of the following modules: 1) an encoder 202 that infers (e.g., determines and/or generates) the latent interaction graph 208 that describes the pairwise interactions within the system (e.g., interactions between nodes/agents in the system); 2) a policy decoder 204 that operates on the latent interaction graph that models the policy (or policies) of the agents in the system; and 3) a reward decoder 206 that defines an interpretable (e.g., interpretable by humans) reward function for the types of latent interaction graphs in the latent space. As will be described in more detail below, in some examples, the interactive system may be modeled as a multi-agent Markov decision process (MDP) whose reward may depend on its inherent interaction graph. Further, in some examples, relational inference may be reframed as an inverse reinforcement learning (IRL) problem.

The reward decoder 206 may be trained (e.g., the reward function(s) may be inferred/determined) from synthetic or actual trajectory data that describes the trajectories over time of the relevant agents in the system, and once the reward decoder 206 is trained, the policy decoder 204 may mimic the policy (or policies) of the agents in the system (e.g., the policies that define and/or control the behavior of the agents in the system). In some examples, the policy decoder 204 may mimic this policy (or policies) by maximizing the accumulative reward modeled by the reward decoder 206.

Because the actual "ground-truth" interaction graph of the system (e.g., the interaction graph that reflects the actual relationships between the agents in the system) may be unknown and inferred/determined by the encoder 202, training of the model 200 may be accomplished via a derived variational extension of adversarial IRL (AIRL) to train the encoder 202, the policy decoder 204 and the reward decoder 206 concurrently.

The reward decoder 206 may define a mapping between the relational latent space/graph 208 and one or more interpretable (e.g., interpretable by humans) reward function spaces. The reward function spaces may include one or more reward functions that describe a category of interpretable interactive behavior between the agents in the system based on the domain knowledge of humans. As such, the reward function(s) may define the meaning of the relational variables in the GIRL model 200, which may ensure that the latent interaction graph/space 208 is interpretable. Further, because the policy decoder 204, which may be trained with the interpretable reward function(s) determined by the reward decoder 206, may generate the corresponding interactive behavior between the agents of the system given the latent variables, the causal connection between the latent interaction graph 208 and the policy decoder 204 may be better aligned with human understanding as well. As a result, the GIRL model proposed herein may be able to provide human interpretability to one or more of its input/output spaces, and therefore actions taken (e.g., autonomous driving actions taken) based on the GIRL model, without the need for manual human annotations of interactions and/or direct supervision.

Further details of the various components of the GIRL model 200 will now be described. As shown in FIG. 2, the GIRL model 200 may include a scene graph 210 as an input. The scene graph 210—also referred to as $g_{scene}$—may be a complete bi-directed graph G=(V, E) for an interactive system with N objects (e.g., a system including the vehicle and one or more other vehicles and/or pedestrians), with vertices V:

$$V=\{v_i\}_{i=1}^N$$

and edges E:

$$E=\{e_{i,j}=(v_i,v_j)|\forall i,j=1,2,\ldots,N \text{ and } i\neq j\}$$

The vertices of $g_{scene}$ may correspond to objects in the system, as previously described. For example, in the scene graph 210 in FIG. 2, the system may include three objects—corresponding to vertices 0, 1 and 2—with one or more interactions between those objects represented by the edges between those objects shown in the scene graph 210. The state vector x of a given object $v_i$ at time t may be given by:

$$x_i^t \in \mathbb{R}^n$$

In some examples, the state sequences of the N objects of the system over T time steps may be an input to the GIRI model 200 (e.g., in the scene graph 210, provided to the encoder 202). For example, the input may have the form:

$$x=(x^0, \ldots, x^{T-1})$$

with:

$$x^t=\{x_1^t, \ldots, x_N^t\}$$

In some examples, the scene graph 210 may be determined by the GIRL-based ADS 108 in FIG. 1 as a result of images captured of the surroundings of the vehicle 102 using the camera system 118, which may then be analyzed/processed by the GIRL-based ADS 108 (or another suitable image recognition process) to identify the agents and/or their actions in the environment of the vehicle 102 (including the vehicle 102).

In some examples, the encoder 202 may be a GNN encoder, as previously described. The encoder 202 may operate over $g_{scene}$ with input $x_i$ assigned to vertex $v_i$ as features of that vertex (corresponding to an agent in the system). In some examples, the encoder 202 may determine the distribution of the latent discrete edge types $z_{i,j}$ of edges $e_{i,j}$ in the latent interaction graph 208. These determined latent variables may be collected into a single vector z. The latent interaction graph 208 may be constructed by assigning $z_{i,j}$ to corresponding edges $e_{i,j}$. For example, in the latent interaction graph 208 shown in FIG. 2, nodes 1 and 2 may have two directional edges connecting them: one edge from node 1 to node 2, and one edge from node 2 to node 1 (shown in FIG. 2 as a bidirectional arrow between nodes 1 and 2). The edge features for each of those edges may be $z_{1,2}$ and $z_{2,1}$, respectively. In some examples, the values for $z_{i,j}$ may be selected from the set $\{0, 1, \ldots, K-1\}$, where K is the number of relational types represented by the system. For example, a given value for $z_{i,j}$ may represent and/or indicate the interactive behavior between vertex $v_i$ and $v_j$ (corresponding to agents i and j, respectively, in the system) with respect to the interactive behavior's effect on the decision-making process of j (corresponding to agent j in the system). For example, in the case of a system where the only interaction types of interest are "following" (e.g., vehicle i is following vehicle j) and "not following" (e.g., vehicle i is not following vehicle j), K may be two, with $z_{i,j}$ being selected from the set $\{0,1\}$.

In some examples, agents in the system may be assumed to be heterogeneous, but with the same state space X, action space A, transition operator T and reward function r. For each node $v_i$ at time step t, its associated reward may depend on its own state $x_j^t$ and action $a_j^t$, and in some examples, its interactions with its neighboring nodes/vertices. For example, a reward for a given node i at time step t may be represented as:

$$r_{\theta,\psi}(v_j^t, z_j) = r_\theta^n(x_j^t, a_j^t) + \sum_{i \in N_j} \sum_{k=0}^K 1(z_{i,j} = k) r_{\psi_k}^{e,k}(x_i^t, a_i^t, x_j^t, a_j^t)$$

where $r_\theta^n$ is the node reward function, $r_{\psi_k}^{e,k}$ is the edge reward function corresponding to the $k^{th}$ type of interaction, and $z_j$ is the vector collecting $\{z_{i,j}\}_{i \in N_j}$. In some examples, the edge reward function may be selected/defined based on the domain knowledge of humans, so that the corresponding interpretable behavior results by maximizing the rewards, as will be described in more detail later. In some examples, the edge reward function $r_{\psi_k}^{e,k}(x_i^t, a_i^t, x_j^t, a_j^t)$ equals zero for k=0, which may indicate that the action of $v_j$ does not depend on its interaction with $v_i$, for example.

In some examples, the agents in the system may be assumed to share the same policy conditioning on their relations/interactions with other agents, and may be assumed to act cooperatively to maximize the accumulative reward of the entire system. In some examples, the accumulative reward may be represented as:

$$R_{\theta,\psi}(\tau, z) = \sum_{t=0}^{T-1} r_{\theta,\psi}(x^t, a^t, z)$$

where $$r_{\theta,\psi}(x^t, a^t, z) = \sum_{j=1}^{N} r_{\theta,\psi}(v_j^t, z_j)$$

In some examples, the joint policy of the system may be represented as $\pi_n(a^t|x^t,z)$.

In some examples, the underlying reward function $r_{\theta,\psi}$ defined above may be determined (e.g., by training the reward decoder 206) together with the policy $\pi_n$ (e.g., by training the policy decoder 204) using a training dynamic system dataset (e.g., provided as an input scene graph 210). In some examples, the training dynamic system dataset may be a demonstration dataset, such as a naturalistic traffic dataset, though it is understood that other training datasets may be used to determine the reward function and/or policy. In some examples, the posterior distribution $p(z|\tau)$ may also be concurrently determined (e.g., by training the encoder 202).

As previously described, in some examples, one or more of the encoder 202, the policy decoder 204 and/or the reward decoder 206 may be modeled as GNNs. In some examples, one or more of the encoder 202, the policy decoder 204 and/or the reward decoder 206 may be modeled as node-to-node message-passing GNNs (e.g., made up of node-to-edge message-passing and edge-to-node message-passing), which may be represented as:

$$v \to e: h_{i,j}^l = f_e^l(h_i^l, h_j^l, x_{i,j})$$

$$e \to v: h_j^{l+1} = f_v^l\left(\sum_{i \in N_j} h_{i,j}^l, x_j\right)$$

where $h_i^l$ may be the embedded hidden state of node $v_i$ in layer l, and $h_{i,j}^l$ may be the embedded hidden state of the edge $e_{i,j}$. Features $x_i$ and $x_{i,j}$ may be assigned to the node $v_i$ and the edge $e_{i,j}$, respectively, as inputs. In some examples, $N_j$ may denote the set of the indices of the neighbors of node $v_i$ connected by an incoming edge. The functions $f_e^l$ and $f_v^l$ may be neural networks for edges and nodes, respectively, and may be shared across the graph within the $l^{th}$ layer of the node-to-node message-passing structure.

In some examples, as previously described, the encoder 202 may operate over the scene graph 210 and may model the posterior distribution as $q_\varnothing(z|\tau)$. $q_\varnothing(z|\tau)$ may be factorized as:

$$q_\Phi(z|\tau) = \prod_{i=1}^{N}\prod_{j=1, j\neq i}^{N} q_\Phi(z_{i,j}|\tau)$$

In some examples, the encoder 202 may model the posterior distribution as $q_\varnothing(z|\tau)$ with the following operations:

$$h_j^1 = f_{emb}(x_j)$$

$$v \to e: h_{i,j}^1 = f_e^1(h_i^1, h_j^1)$$

$$e \to v: h_j^2 = f_v^1\left(\sum_{i\neq j} h_{i,j}^1\right)$$

$$v \to e: h_{i,j}^2 = f_e^2(h_i^2, h_j^2)$$

$$q_\Phi(z_{i,j}|\tau) = softmax(h_{i,j}^2)$$

where $f_e^1$, $f_v^1$, and $f_e^2$ may be fully-connected networks (e.g., multilayer perceptron (MLP) networks), and $f_{emb}$ may be a 1D convolutional network (CNN) with, for example, attentive pooling.

In some examples, the latent interaction graph 208 may be obtained (e.g., by the encoder 202) by sampling z from $q_\varnothing(z|\tau)$. The reward decoder 206 may operate over the latent interaction graph 208, and may be formulated as $r_{\theta,\psi}(v_j^t,z_j)$ as previously described. In some examples, the reward decoder 206 may be formulated differently as:

$$\tilde{r}_j^t = r_\theta^n(x_j^t, a_j^t)$$

$$v \to e: r_{i,j}^t = \sum_{k=0}^{K} 1(z_{i,j} = k) r_{\psi_k}^{e,k}(x_i^t, a_i^t, x_j^t, a_j^t)$$

$$e \to v: r_j^t = \tilde{r}_j^t + \sum_{i \neq j} r_{i,j}^t$$

The reward for the entire system at time step t may be determined as $$r_{\theta,\psi}(x^t, a^t, z) = \sum_{j=1}^{N} r_j^t,$$

where $r_\theta^n$ and $r_{\psi_k}^{e,k}$ may be functions that have structure depending on the specific scenario of interest. For example, in the case of a system in which vehicles are following one another, $r_\theta^n$ and $r_{\psi_k}^{e,k}$ may have a first structure, while in a case of a system in which vehicles are giving way to one another, $r_\theta^n$ and $r_{\psi_k}^{e,k}$ may have a second structure, different from the first structure. In some examples, $r_\theta^n$ and $r_{\psi_k}^{e,k}$ may be neural networks, and in some examples, $r_\theta^n$ and $r_{\psi_k}^{e,k}$ may not be neural networks, but may be other types of functions.

As previously described, the policy decoder 204, which may be a GNN decoder, may operate over the latent interaction graph 208. In some examples, the policy decoder 204 may model the distribution $\pi_n(a^t|x^t,z)$, which may be factorized with $\pi_n(a_j^t|x^t,z)$. The policy decoder 204 may model the policy as follows:

$$v \to e: \tilde{h}_{i,j}^t = \sum_{k=0}^{K} 1(z_{i,j} = k) \tilde{f}_e^k(x_i^t, x_j^t)$$

$$e \to v: \mu_j^t = \tilde{f}_v \sum_{i \neq j} \tilde{h}_{i,j}^t$$

$$\pi_n(a_j^t|x^t, z) = N(\mu_j^t, \sigma^2 I)$$

In some examples, $\pi_n$ may be modeled as a Gaussian distribution with mean value parameterized by the GNN policy decoder 204. In some examples, the variance $\sigma^{-2}$ may not depend on $x^t$ and z. For example, the variance $\sigma^2$ may be treated as a tunable parameter, and its value may be adjusted through gradient descent or other suitable methods. Agent trajectories may be sampled with the policy model using the action $a^t$ sampled from $\pi_n(a^t|x^t,z)$ to propagate $x^t$ to $x^{t+1}$. In some examples, the propagation may be achieved with a transition operator T, or an environment with T defined as node dynamics for the nodes/vertices in the system.

In some examples, a different model for the policy may be used that may improve the capacity of the model. For example, a recurrent policy model may be used. In some examples, the recurrent policy model may be represented by $\pi_n(a_j^t | x^t, \ldots, x^1, z)$. In such a recurrent policy model, the agents in the system may be defined to take action(s) according to all or part of the historical trajectory of the system. An example recurrent model may be expressed as:

$$v \to e : \tilde{h}_{i,j}^t = \sum_{k=0}^{K} 1(z_{i,j} = k) \tilde{f}_e^k(\tilde{h}_i^t, h_j^t)$$

$$e \to v : \tilde{h}_j^{t+1} = GRU\left(\sum_{i \neq j} \tilde{h}_{i,j}^t, x_j^t, \tilde{h}_j^t\right)$$

$$\mu_j^t = f_{out}(\tilde{h}_j^{t+1})$$

$$\pi_n(a_j^t | x^t, z) = N(\mu_j^t, \sigma^2 I)$$

where $\tilde{h}_i^t$ may be the current hidden state encoding the historical information of the system up to time step t−1.

Referring back to the GIRI model 200 shown in FIG. 2, and based on the above descriptions of the encoder 202, policy decoder 204, and reward decoder 206, a training trajectory $\tau^E$ 220 ∈ $D^E$ of a given agent $x_j^E$ may be assigned to that agent's corresponding vertex $v_i$ in the scene graph 210 as a feature of that vertex/node. In some examples, such vertex-assignment of a training trajectory may be performed for each agent in the system. The scene graph 210 may then be provided to the encoder 202, which may determine the distribution $q_\varnothing(z|\tau^E)$ of the latent interaction graph 208. Samples of the latent interaction graph 208 may be obtained by sampling from $q_\varnothing(z|\tau^E)$. The samples of the latent interaction graph 208 and an initial state of the training trajectory $\tau^E, x^{E,0}$ 212 may be used by the policy decoder 204 to generate a trajectory $\tau^G$ 214 starting from the initial state $\tau^E, x^{E,0}$ 212. The reward decoder 206 may determine the accumulative rewards R for one or both of $\tau^G$ 214 and $\tau^E$ 220 (shown as R ($\tau^G$,z) 216 and R ($\tau^E$,z) 218 in FIG. 2).

In some examples, if structured and/or trained as described herein, the policy decoder 204 may be able to reconstruct $\tau^E$ (e.g., $\tau^G$ may be the same or substantially the same as $\tau^E$) given $x^{E,0}$ and $q_\varnothing(z|\tau^E)$. Further, in such examples, R ($\tau^G$,z) and R ($\tau^E$,z) may be equal or substantially equal.

In some examples, models for the encoder 202, the policy decoder 204 and/or the reward decoder 206 may be determined by solving the following equation:

$$\max_\eta \min_{\theta,\psi,\phi} \mathbb{E}_{\tau^E \sim \pi^E(\tau)} \left\{ \mathbb{E}_{z \sim q_\varnothing(z|\tau^E)} \right.$$

$$\left. \left[ -\sum_{t=0}^{T-1} \log D_{\theta,\psi,\eta}(x^{E,t}, a^{E,t}, z) - \mathbb{E}_{\tau^G \sim \pi_\eta(\tau|z)} \sum_{t=0}^{T-1} \log(1 - D_{\theta,\psi,\eta}(x^{G,t}, a^{G,t}, z)) \right] \right\}$$

$$\text{s.t. } \mathbb{E}_{\tau^E \sim \pi^E(\tau)} \{ KL[q_\varnothing(z|\tau^E) \| p(z)] \} \leq I_c$$

where $$D_{\theta,\psi,\eta}(x, a, z) = \frac{\exp\{r_{\theta,\psi}(x, a, z)\}}{\exp\{r_{\theta,\psi}(x, a, z)\} + \pi_\eta(a|x, z)}$$

Based on the above equations, the models may be trained in an adversarial scheme (e.g., using an adversarial inverse reinforcement learning (AIRL) algorithm, such as one that follows the principle of maximum entropy inverse reinforcement learning). For example, if the objective function in the above equations is denoted as $J(\theta,\psi,\phi,\eta)$, the objective for the discriminator $D_{\theta,\psi,\theta}$ (e.g., corresponding to the encoder 202 and the reward decoder 206) may be the following minimization problem given $\eta$:

$$\min_{\theta,\psi,\phi} J(\theta, \psi, \phi, \eta)$$

$$\text{s.t. } \mathbb{E}\{ KL[q_\varnothing(z|\tau^E) \| p(z)] \} \leq l_c$$

The objective for the generator (e.g., corresponding to the policy decoder 204) may be the following maximization problem given $\theta$, $\psi$ and $\phi$:

$$\max_\eta J(\theta, \psi, \phi, \eta)$$

In some examples, when node dynamics are unknown and/or non-differentiable, $$\max_\eta J(\theta, \psi, \phi, \eta)$$

may be solved using maximum entropy reinforcement learning (RL) algorithms. However, in some scenarios in which node dynamics are known/assumed and/or differentiable, gradient descent may be used to solve $$\max_\eta J(\theta, \psi, \phi, \eta),$$

which may allow for simplified training of the models as compared with using maximum entropy RL, for example.

As described above, in some examples, an $I_c$ constraint may be placed on the expectation of the objective function for the discriminator $D_{\theta,\psi,\eta}$. Such constraint-wise regularization may be beneficial in situations where the models used in the system of the disclosure are essentially not generative (e.g., where $\tau^G$ is not generated from the prior distribution of the system p(z), but rather from the inferred posterior distribution $q_\varnothing(z|\tau^E)$). Further, the minimization problem $$\min_{\theta,\psi,\phi} J(\theta, \psi, \phi, \eta)$$

may be able to be solved by introducing a Lagrange multiplier $\beta$ as follows:

$$\min_{\theta,\psi,\phi} \max_{\beta \geq 0} J(\theta, \psi, \phi, \eta) + \beta(\mathbb{E}\{ KL[q_\varnothing(z|\tau^E) \| p(z)] \} - I_c)$$

By performing the above, the model parameters may be updated via gradient descent. In some examples, β may be updated via dual gradient descent with step size a as follows:

$$\beta \leftarrow \max(0, \alpha_\beta(\mathbb{E}\{KL[q_\varnothing(z|\tau^E)\|p(z)]\} - I_c))$$

In some examples, β may be initialized at 0, and its value may be gradually increased, which may allow the models to determine z for the purpose of reward learning early in the iterations, without having to be regularized for sparsity. If performed in another way, the reward function may converge on an incorrect local optimum, which may lead to an incorrect determination of relationships between nodes/vertices in the latent interaction graph 208.

In the ways described with reference to FIG. 2, the GIRL model 200 of the disclosure, which may provide better interpretability to humans with respect to components of the model, inputs/outputs to the model, and/or autonomous driving actions taken by the autonomous driving system implementing the GIRL model, may be constructed, trained and operated.

Figure 3A:
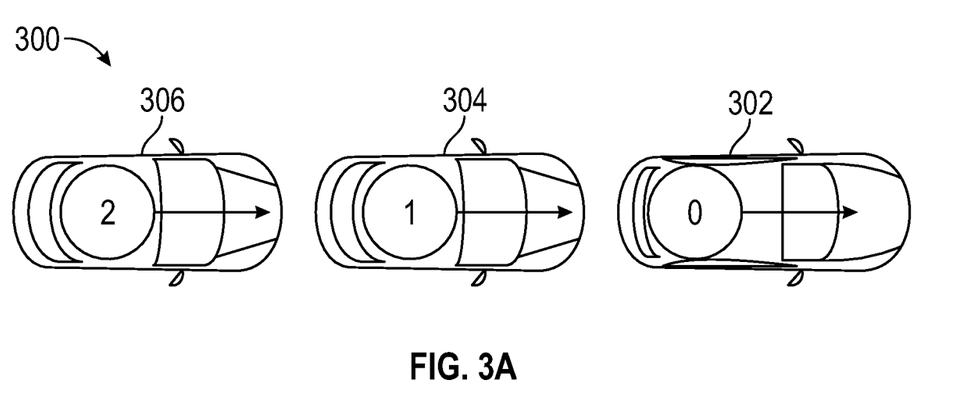
FIGS. 3A-3C illustrate an example of the GIRI model of the disclosure applied to a driving scenario involving three vehicles according to some examples of the disclosure.
Figure 3B:
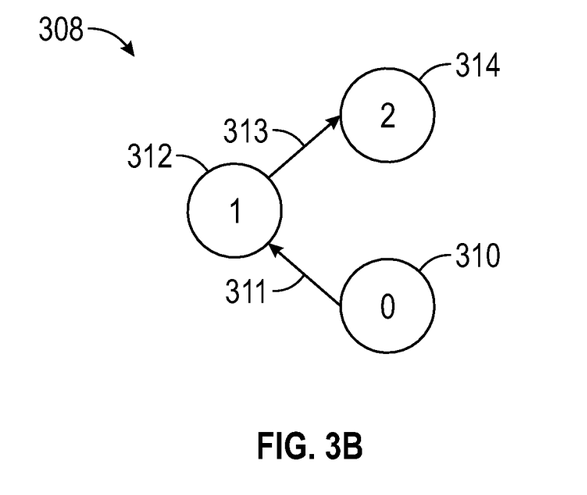
Figure 3C:
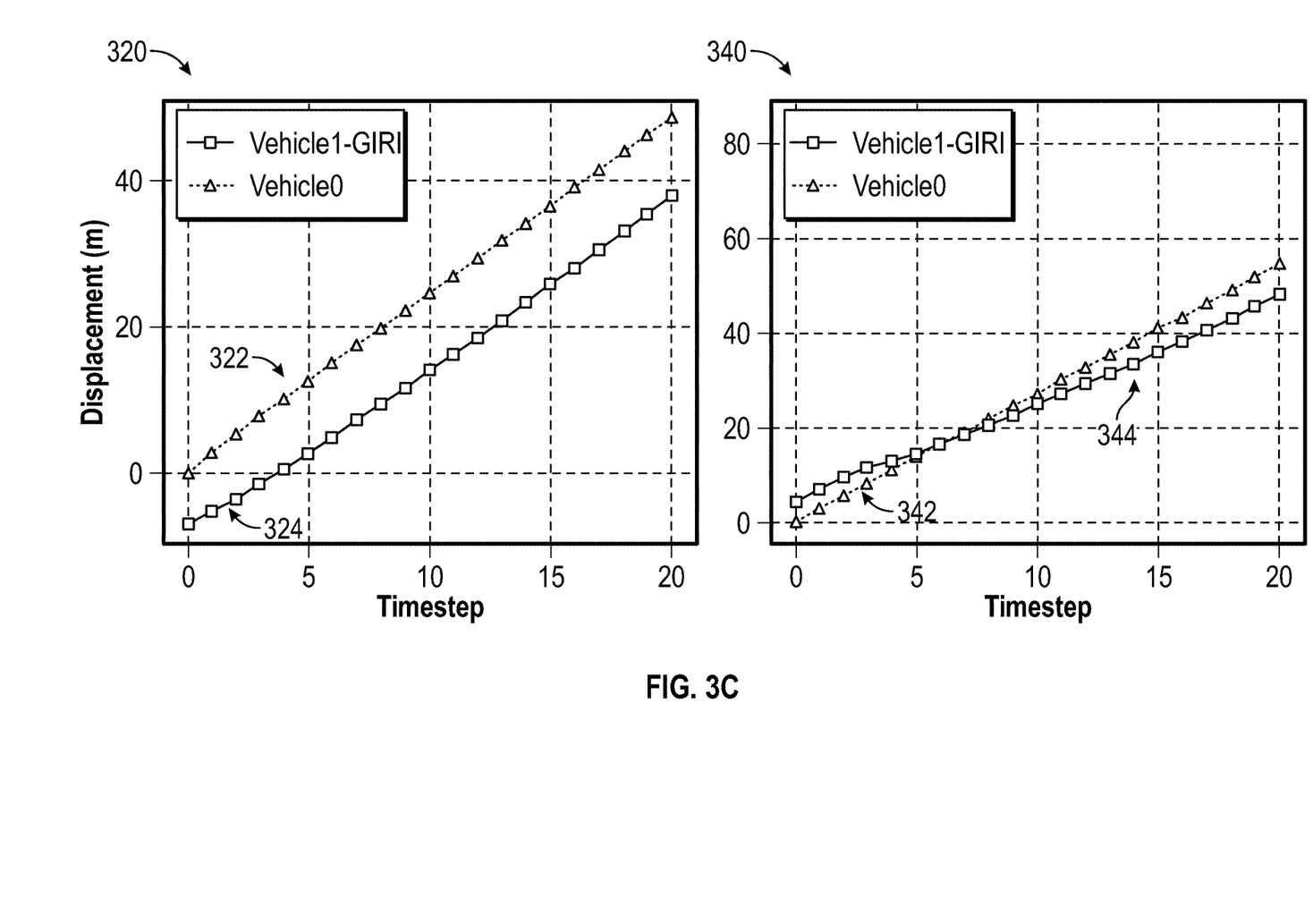

An example of applying the GIRI model to a driving scenario will now be described. FIGS. 3A-3C illustrate an example of the GIRI model of the disclosure applied to a driving scenario involving three vehicles according to some examples of the disclosure. In particular, FIG. 3A illustrates a car-following example, in which vehicle 0 302 is a leading vehicle, vehicle 1 304 is following vehicle 0, and vehicle 2 306 is following vehicle 1 304. An example latent interaction graph 308 for such a car-following example is illustrated in FIG. 3B. FIG. 3B includes a node 310 corresponding to vehicle 0 302, a node 312 corresponding to vehicle 1 304, and a node 314 corresponding to vehicle 2 306. In the latent interaction graph 308, two types of edges may be represented: $z_{i,j}=1$ may indicate that vehicle j is following vehicle i, whereas $z_{i,j}=0$ may indicate that the action of vehicle j does not depend on vehicle i (e.g., vehicle j is not following vehicle i). For example, in FIG. 3B, $z_{0,1}=z_{1,2}=1$ for edges 311 and 313, respectively, and $z_{i,j}=0$ for all other edges (as such, those edges are not illustrated in FIG. 3B).

With respect to the reward function for the example of FIGS. 3A-3C, humans may generally expect that a following-vehicle would maintain a proper safe distance from the leading vehicle. As such, the reward functions used in the GIRI model may be designed based on that human understanding (e.g., to reward maintaining a safe distance and/or punish not maintaining a safe distance). In this way, the latent space may be consistent with a human driver's understanding of car-following behavior, which may contribute to the interpretability of the GIRI model and/or its resulting decisions/actions.

The MDP for the scenario of FIG. 3A may be defined as follows. For example, for each vehicle $v_i$ at time step t, its state vector $x_j^t$ may have three states: longitudinal position $s_j^t$, longitudinal speed $v_j^t$ and longitudinal acceleration $a_j^t$. The action $a_j^t$ may be the finite difference of acceleration from t to t+1, and may be denoted as $\delta a_j^t$. The node dynamics may be modeled as differentiable and known, and may be reflected as follows:

$$s_j^{t+1} = s_j^t + v_j^t * \Delta t + \frac{1}{2} a_j^t * \Delta t^2$$

$$v_j^{t+1} = v_j^t + a_j^t * \Delta t$$

$$a_j^{t+1} = a_j^t + \delta a_j^t * \Delta t$$

The reward functions $r_\theta^n$ and $r_{\psi k}^{e,k}$ may be defined based on humans' understanding of car-following behavior, as mentioned previously. During training, the GIRI model may be provided training trajectories for the three vehicles. The GIRI model may be trained to reconstruct the trajectories of the following vehicles (e.g., vehicles 1 and/or 2) given the trajectory of the leading vehicle (e.g., vehicle 0).

One example set of edge and node reward functions $r_\theta^n$ and $r_{\psi k}^{e,k}$ may be:

$$r_\theta^n(x_j^t, a_j^t) = -\exp(\theta_0) f_v(x_j^t) - \exp((\theta_1) f_{acc}(x_j^t) - \exp(\theta_2) f_{jerk}(a_j^t)$$

$$r_{\psi 1}^{e,1}(x_i^t, x_j^t) = -(1 + \exp(\psi_{1,0})) f_{IDM}(x_i^t, x_j^t) - (1 + \exp(\psi_{1,1})) f_{dist}(x_i^t, x_j^t)$$

where the various features may be defined as follows:

$$f_v(x_j^t) = (v_j^t - v_{lim})^2$$

$$f_{acc}(x_j^t) = (a_j^t)^2$$

$$f_{jerk}(a_j^t) = (\delta a_j^t)^2$$

$$f_{IDM}(x_i^t, x_j^t) = (\max(s_i^t - s_j^t, 0) - \Delta s_{i,j}^{IDM,t})^2$$

$$f_{dist}(x_i^t, x_j^t) = \exp\left(-\frac{(\max(s_i^t - s_j^t, 0))^2}{\zeta^2}\right)$$

In the above reward functions, $f_v$ may capture the incentive to drive at a certain speed limit $v_{lim}$, and $f_{acc}$ and $f_{jerk}$ may penalize large accelerations and/or jerking motions, which may result in smoother maneuvering. $f_{IDM}$ may guide the model to mimic the car-following behavior modeled by the intelligent driver model (IDM), and $f_{dist}$ may ensure that vehicle j remains behind vehicle i without collision. max $(s_i^t - s_j^t, 0)$ may ensure that the penalty for vehicle j for passing vehicle i is the same (or substantially the same) as the penalty for colliding with vehicle i. Using the above, the GIRI model may determine values for parameters $\theta_0$, $\theta_1$, $\theta_2$, $\psi_{1,0}$, $\psi_{1,1}$ during training, as previously described. Once learned, these parameters may be used by the GIRL model to properly model a car-following behavior, as described, in a manner that is interpretable to humans.

For example, FIG. 3C illustrates example displacement plots (corresponding to $s_i^t$) for vehicles 0 and 1 for trajectories generated by the GIRI model of the disclosure given initial positions for vehicles 0 and 1. In both plots, vehicle 1 is set to be following vehicle 0 (e.g., as in FIG. 3A). In plot 320, the initial positions of vehicles 0 and 1 are set such that vehicle 0 is ahead of vehicle 1. As shown in plot 320, the displacement line 322 for vehicle 0 remains ahead of the displacement line 342 for vehicle 1, which is what would be expected. In plot 340, the initial positions of vehicles 0 and 1 are set such that vehicle 1 is ahead of vehicle 0 (even though vehicle 1 is also defined as following vehicle 0, as described herein). As shown in plot 340, while the displacement line 342 of vehicle 0 initially remains behind the displacement line 344 of vehicle 1, eventually, the displacement line 342 of vehicle 0 overtakes the displacement line 344 of vehicle 1, and remains that way, which is what would be expected for situation in which vehicle 1 is following vehicle 0. Thus, in the scenario of plot 340, the GIRI policy decoder (e.g., decoder 204) may slow down vehicle 1 until vehicle 0 passes it, which may indicate that the GIRI policy decoder conforms with and/or achieves the human-interpretable behavior of a car-following scenario.

As mentioned previously, reward functions other than those described above may be used with the GIRI model of the disclosure. For example, example reward functions with larger capacity may be:

$$r_\theta^n(x_j^t, a_j^t) = -\exp(\theta_0) f_v^{NN}(x_j^t) - \exp(\theta_1) f_{acc}(x_j^t) - \exp(\theta_2) f_{jerk}(x_j^t, a_j^t)$$

$$r_{\psi_1}^{e,1}(x_i^t, x_j^t) = -(1+\exp(\psi_{1,0})) g_v^{NN}(x_i^t, x_j^t) - (1+\exp(\psi_{1,1})) g_s^{NN}(x_i^t, x_j^t)$$

where the various features may be defined as follows:

$$f_v^{NN}(x_j^t) = (v_j^t - h_1(s_j^t, a_j^t))^2$$

$$g_v^{NN}(x_i^t, x_j^t) = (v_j^t - h_2(s_i^t - s_j^t, v_j^t, v_i^t, a_j^t, a_i^t))^2$$

$$g_s^{NN}(x_i^t, x_j^t) = \text{ReLU}(h_3(s_i^t - s_j^t, v_j^t, v_i^t, a_j^t, a_i^t) - s_i^t + s_j^t)^2$$

In the above reward functions, the features $f_{acc}$ and $f_{jerk}$ may be as previously described. The functions $h_1$, $h_2$ and $h_3$ may be neural networks with rectified linear units (ReLU) as output activation functions. The ReLU function may penalize a vehicle for maintaining a distance less than a desired safe following distance, for example. In some examples, the GIRI model may be trained using the above reward functions (e.g., using any of the appropriate models described here, such as a recurrent policy model). Other reward functions may similarly be used in the GIRI model of the disclosure.

Figure 4:
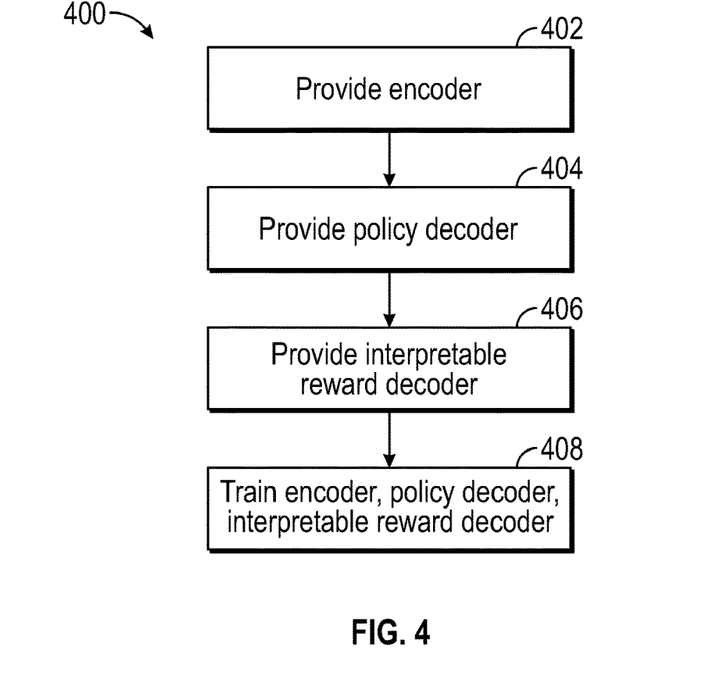
FIG. 4 illustrates an example process for constructing and/or training a GIRI model according to some examples of the disclosure.

FIG. 4 illustrates an example process 400 for constructing and/or training a GIRI model according to some examples of the disclosure. Process 400 may reflect the subject matter described with references to FIGS. 1-3. For example at 402, an encoder (e.g., encoder 202) may be provided. The encoder may determine the latent interaction graph that describes the pairwise interactions within the system. In some examples, the encoder may be modeled as a node-to-node message-passing GNN (e.g., made up of node-to-edge message-passing and edge-to-node message-passing). In some examples, the encoder may operate over the scene graph 210 and may model the posterior distribution as $q_\Theta(z|\tau)$.

At 404, a policy decoder (e.g., decoder 204) may be provided. The policy decoder may operate on the inferred latent interaction graph to model the dynamics of the system. The policy decoder, which may be trained with the interpretable reward function(s) determined by a reward decoder, may generate the corresponding interactive behavior between the agents of the system given the latent variables. In some examples, the policy decoder may be modeled as a node-to-node message-passing GNN (e.g., made up of node-to-edge message-passing and edge-to-node message-passing). In some examples, the policy decoder may operate over the latent interaction graph, and may model the distribution $\pi_n(a^t|x^t, z)$, which may be factorized with $\pi_n(a_j^t|x^t, z)$.

At 406, an interpretable reward decoder (e.g., decoder 206) may be provided. The reward decoder may define an interpretable (e.g., interpretable by humans) reward function for the types of latent interaction graphs in the latent space. The reward function(s) may define the meaning of the relational variables in the GIRI model, which may ensure that the latent interaction graph/space is interpretable. In some examples, the reward decoder may be modeled as a node-to-node message-passing GNN (e.g., made up of node-to-edge message-passing and edge-to-node message-passing). In some examples, the reward decoder may operate over the latent interaction graph, and may be formulated as $r_{\theta,\psi}(v_j^t, z_j)$.

At 408, the encoder, the policy decoder, and/or the reward decoder may be trained using demonstration trajectories of agents in the system, in a supervised or unsupervised manner. The reward decoder may be trained (e.g., the reward function(s) may be inferred/determined) from synthetic or actual trajectory data that describes the trajectories over time of the relevant agents in the system, and once the reward decoder is trained, the policy decoder may mimic the policy (or policies) of the agents in the system (e.g., the policies that define and/or control the behavior of the agents in the system). Because the actual "ground-truth" interaction graph of the system (e.g., the interaction graph that reflects the actual relationships between the agents in the system) may be unknown and inferred/determined by the encoder, training of the GIRL model may be accomplished via a derived variational extension of adversarial IRL (AIRL) to train the encoder, the policy decoder and the reward decoder concurrently. In some examples, the underlying reward function $r_{\theta,\psi}$ defined above may be determined (e.g., by training the reward decoder) together with the policy $\pi_n$ (e.g., by training the policy decoder) using a training dynamic system dataset (e.g., provided as an input scene graph). In some examples, the training dynamic system dataset may be a demonstration dataset, such as a naturalistic traffic dataset, though it is understood that other training datasets may be used to determine the reward function and/or policy. In some examples, the posterior distribution $p(z|\tau)$ may also be concurrently determined (e.g., by training the encoder).

Figure 5:
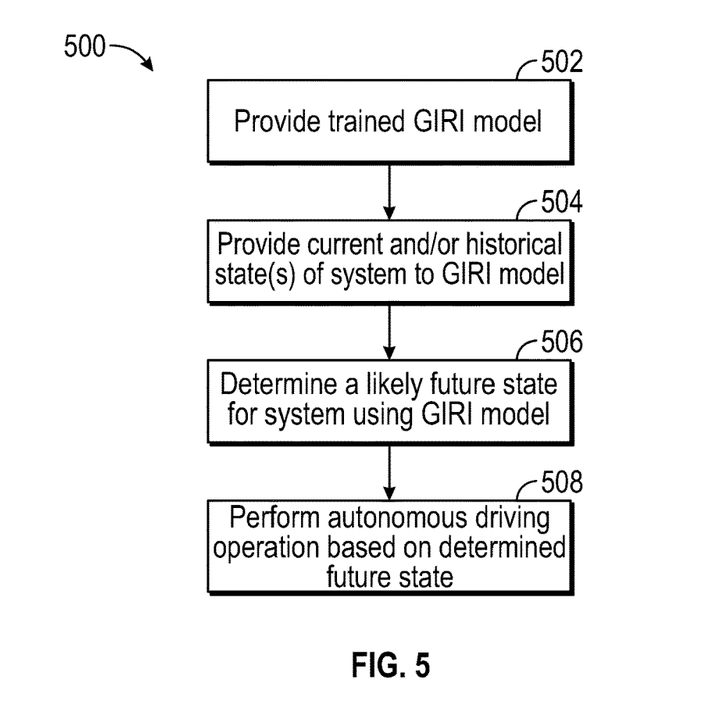
FIG. 5 illustrates an example process for utilizing a trained GIRI model to perform autonomous driving operations according to some examples of the disclosure.

FIG. 5 illustrates an example process 500 for utilizing a trained GIRI model to perform autonomous driving operations according to some examples of the disclosure. At 502, a trained GIRL model (e.g., GIRI model 200) may be provided, such as described with reference to FIG. 4. At 504, the current and/or historical states of the system of interest (e.g., the present vehicle and other vehicles/objects/pedestrians in an environment of the vehicle) may be provided to the GIRL model. For example, cameras, radar, or other environment detection equipment on the vehicle may detect, analyze and process the data about the environment of the vehicle (e.g., over time), and information about the agents in the system (e.g., positions, velocities, accelerations, etc., in some examples, over time) may be provided to the GIRL model. In examples in which a recurrent policy model is used in the GIRI model, for example, the agents in the system may be defined to take action(s) according to all or part of the historical trajectory of the system. At 506, a future state of the system may be determined using the GIRL model (e.g., the GIRI model may generate future trajectories for the agents in the system after being trained on the observed trajectories of the agents in the system). The future state of the system may be determined by, for example, the policy decoder to generate generated trajectories, as previously described. At 508, a vehicle operation may be performed (e.g., by the GIRL-based ADS 108) to control operation of the vehicle based on the determined future state of the system. For example, in the case of a system in which a vehicle in front of the instant vehicle is following another vehicle, and if the determined future state of the system indicates that the vehicle in front of the instant vehicle is going to slow down because the lead vehicle has slowed down, the instant vehicle may autonomously apply braking power, or reduce throttle application, to slow itself down to avoid a collision.

As described above, examples of the disclosure are directed to a GIRI model that may define an interpretable relational latent space for relational inference through IRL. The GIRL model may be capable of inferring an interpretable interaction graph for interactive traffic scenarios. The interaction graph may summarize the relations of agents in the system sufficiently such that the dynamics of the system may be modeled effectively based on the graph.

Therefore, according to the above, some examples of the disclosure are directed to a method comprising: at an electronic device with one or more processors and memory: representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system; modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system; and controlling autonomous operation based on the modeling of the dynamic system. Additionally or alternatively to one or more of the examples above, in some examples, the respective machine learning model comprises a grounded interpretable relational inference (GIRI) model. Additionally or alternatively to one or more of the examples above, in some examples, the method further comprises training the respective machine learning model using adversarial inverse reinforcement learning. Additionally or alternatively to one or more of the examples above, in some examples, the reward decoder comprises a graph neural network that operates on the graph-based representation to evaluate the one or more reward functions. Additionally or alternatively to one or more of the examples above, in some examples, the method further comprises determining, by a graph neural network encoder, the graph-based representation of the dynamic system. Additionally or alternatively to one or more of the examples above, in some examples, the graph-based representation of the dynamic system is determined based on one or more characteristics of an environment sensed by one or more sensors. Additionally or alternatively to one or more of the examples above, in some examples, the method further comprises determining, by a graph neural network decoder, a trajectory for the dynamic system based on the evaluated one or more reward functions. Additionally or alternatively to one or more of the examples above, in some examples, controlling the autonomous operation is based on the determined trajectory for the dynamic system.

Some examples of the disclosure are directed to an electronic device comprising: one or more processors; and memory storing instructions, which when executed by the one or more processors, cause the electronic device to perform a method comprising: representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system; modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system; and controlling autonomous operation based on the modeling of the dynamic system. Additionally or alternatively to one or more of the examples above, in some examples, the respective machine learning model comprises a grounded interpretable relational inference (GIRI) model. Additionally or alternatively to one or more of the examples above, in some examples, the method further comprises training the respective machine learning model using adversarial inverse reinforcement learning. Additionally or alternatively to one or more of the examples above, in some examples, the reward decoder comprises a graph neural network that operates on the graph-based representation to evaluate the one or more reward functions. Additionally or alternatively to one or more of the examples above, in some examples, the graph-based representation of the dynamic system is determined based on one or more characteristics of an environment sensed by one or more sensors. Additionally or alternatively to one or more of the examples above, in some examples, the method further comprises determining, by a graph neural network decoder, a trajectory for the dynamic system based on the evaluated one or more reward functions.

Some examples of the disclosure are directed to a non-transitory computer-readable storage medium storing instructions, which when executed by one or more processors of an electronic device, cause the electronic device to perform a method comprising: representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on domain knowledge of the dynamic system; modeling the dynamic system through a respective machine learning model that includes a reward decoder that operates on the graph-based representation and evaluates one or more reward functions for the dynamic system, wherein the one or more reward functions for the dynamic system are defined based on the human domain knowledge of the dynamic system; and controlling autonomous operation based on the modeling of the dynamic system. Additionally or alternatively to one or more of the examples above, in some examples, the respective machine learning model comprises a grounded interpretable relational inference (GIRI) model. Additionally or alternatively to one or more of the examples above, in some examples, the method further comprises training the respective machine learning model using adversarial inverse reinforcement learning. Additionally or alternatively to one or more of the examples above, in some examples, the reward decoder comprises a graph neural network that operates on the graph-based representation to evaluate the one or more reward functions. Additionally or alternatively to one or more of the examples above, in some examples, the graph-based representation of the dynamic system is determined based on one or more characteristics of an environment sensed by one or more sensors. Additionally or alternatively to one or more of the examples above, in some examples, the method further comprises determining, by a graph neural network decoder, a trajectory for the dynamic system based on the evaluated one or more reward functions.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
at an electronic device with one or more processors and memory:
representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on human domain knowledge of the dynamic system;
modeling the dynamic system through a respective machine learning model that includes a reward decoder that operates on the graph-based representation and evaluates one or more reward functions for the dynamic system, wherein:
the one or more reward functions for the dynamic system are defined based on the human domain knowledge of the dynamic system,
the one or more reward functions include a first reward function that evaluates a first category of human interpretable behavior between the one or more agents in the dynamic system, and a second reward function that evaluates a second category, different from the first category, of human interpretable behavior between the one or more agents in the dynamic system, and
the first reward function is a node reward function and the second reward function is an edge reward function; and
controlling autonomous operation based on the modeling of the dynamic system.

2. The method of claim 1, wherein the respective machine learning model comprises a grounded interpretable relational inference (GIRI) model.

3. The method of claim 1, further comprising training the respective machine learning model using adversarial inverse reinforcement learning.

4. The method of claim 1, wherein the reward decoder comprises a graph neural network that operates on the graph-based representation to evaluate the one or more reward functions.

5. The method of claim 1, further comprising determining, by a graph neural network encoder, the graph-based representation of the dynamic system.

6. The method of claim 1, wherein the graph-based representation of the dynamic system is determined based on one or more characteristics of an environment sensed by one or more sensors.

7. The method of claim 1, further comprising determining, by a graph neural network decoder, a trajectory for the dynamic system based on the evaluated one or more reward functions.

8. The method of claim 7, wherein controlling the autonomous operation is based on the determined trajectory for the dynamic system.

9. The method of claim 1, wherein:
the node reward function evaluates one or more human interpretable behaviors of one or more of the one or more agents based on their compliance with one or more node parameters, and applies penalties for deviations from the one or more node parameters, and
the edge reward function evaluates one or more human interpretable behaviors between one or more of the one or more agents based on their compliance with one or more edge parameters, and applies penalties for deviations from the one or more edge parameters.

10. An electronic device comprising:
one or more processors; and
memory storing instructions, which when executed by the one or more processors, cause the electronic device to perform a method comprising:
representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on human domain knowledge of the dynamic system;
modeling the dynamic system through a respective machine learning model that includes a reward decoder that operates on the graph-based representation and evaluates one or more reward functions for the dynamic system, wherein:
the one or more reward functions for the dynamic system are defined based on the human domain knowledge of the dynamic system,
the one or more reward functions include a first reward function that evaluates a first category of human interpretable behavior between the one or more agents in the dynamic system, and a second reward function that evaluates a second category, different from the first category, of human interpretable behavior between the one or more agents in the dynamic system, and
the first reward function is a node reward function and the second reward function is an edge reward function; and
controlling autonomous operation based on the modeling of the dynamic system.

11. The electronic device of claim 10, wherein the respective machine learning model comprises a grounded interpretable relational inference (GIRI) model.

12. The electronic device of claim 10, wherein the method further comprises training the respective machine learning model using adversarial inverse reinforcement learning.

13. The electronic device of claim 10, wherein the reward decoder comprises a graph neural network that operates on the graph-based representation to evaluate the one or more reward functions.

14. The electronic device of claim 10, wherein the graph-based representation of the dynamic system is determined based on one or more characteristics of an environment sensed by one or more sensors.

15. The electronic device of claim 10, wherein the method further comprises determining, by a graph neural network decoder, a trajectory for the dynamic system based on the evaluated one or more reward functions.

16. A non-transitory computer-readable storage medium storing instructions, which when executed by one or more processors of an electronic device, cause the electronic device to perform a method comprising:
representing a dynamic system through a graph-based representation, wherein one or more nodes in the graph-based representation correspond to one or more agents in the dynamic system, and one or more edges between the nodes in the graph-based representation correspond to one or more interactions between the agents in the dynamic system, wherein the interactions are defined based on human domain knowledge of the dynamic system;

modeling the dynamic system through a respective machine learning model that includes a reward decoder that operates on the graph-based representation and evaluates one or more reward functions for the dynamic system, wherein:

the one or more reward functions for the dynamic system are defined based on the human domain knowledge of the dynamic system, the one or more reward functions include a first reward function that evaluates a first category of human interpretable behavior between the one or more agents in the dynamic system, and a second reward function that evaluates a second category, different from the first category, of human interpretable behavior between the one or more agents in the dynamic system, and the first reward function is a node reward function and the second reward function is an edge reward function; and controlling autonomous operation based on the modeling of the dynamic system.

17. The non-transitory computer-readable storage medium of claim 16, wherein the respective machine learning model comprises a grounded interpretable relational inference (GIRI) model.

18. The non-transitory computer-readable storage medium of claim 16, wherein the method further comprises training the respective machine learning model using adversarial inverse reinforcement learning.

19. The non-transitory computer-readable storage medium of claim 16, wherein the reward decoder comprises a graph neural network that operates on the graph-based representation to evaluate the one or more reward functions.

20. The non-transitory computer-readable storage medium of claim 16, wherein the graph-based representation of the dynamic system is determined based on one or more characteristics of an environment sensed by one or more sensors.

21. The non-transitory computer-readable storage medium of claim 16, wherein the method further comprises determining, by a graph neural network decoder, a trajectory for the dynamic system based on the evaluated one or more reward functions.

* * * * *